June 10, 1941.    C. H. WHITE    2,245,374
DISK HARROW
Original Filed March 25, 1939

INVENTOR.
CHARLES H. WHITE.
BY
ATTORNEYS

Patented June 10, 1941

2,245,374

UNITED STATES PATENT OFFICE 2,245,374

DISK HARROW

Charles H. White, Moline, Ill., assignor to Deere & Company, Moline, Ill., a corporation of Illinois Application March 25, 1939, Serial No. 264,058
Renewed July 13, 1940

39 Claims. (Cl. 55—81)

The present invention relates to harrows, having particular reference to disk harrows designed to be drawn by a tractor.

One of the principal objects of my invention is to provide an improved sectionalized harrow having great flexibility so that the various sections of the harrow are enabled to follow the contour of the land more closely than heretofore. The greater flexibility of my construction is particularly advantageous in harrows having a relatively wide span, and finds its principal application in harrows of the type having two oppositely extending gangs, each of which is constructed of three gang sections.

Another object of the present invention, therefore, is to provide a harrow gang having a plurality of sections and at least one of which is movably bodily up and down relative to the others.

A further object is to provide a sectionalized harrow gang of the type described above, in which one of the end sections is pivotally connected to the gang frame and can be folded upwardly and over upon the other sections for the purpose of increasing the load thereon or for decreasing the overall width of the implement.

Still another object of the present invention is to provide improved means for connecting the vertically movable section to the gang frame so that the thrust of the disks tends to keep that section level with and parallel to the fixed sections, thereby insuring a uniform depth of penetration for the disks of each section when operating on level ground. This tendency is not sufficient, however, to interfere with the up and down movement of the movable section as it follows the contour of rolling or irregular ground, but merely acts to bring the movable section back level with the other sections if it is momentarily deflected up or down.

These and other objects and advantages of the present invention will become apparent to those skilled in the art after a consideration of the following detailed description of a preferred embodiment thereof, reference being had to the appended drawing, in which Figure 1 is a fragmentary plan view of one gang of a disk harrow of the tractor propelled type embodying the principles of the present invention;

Figure 1:
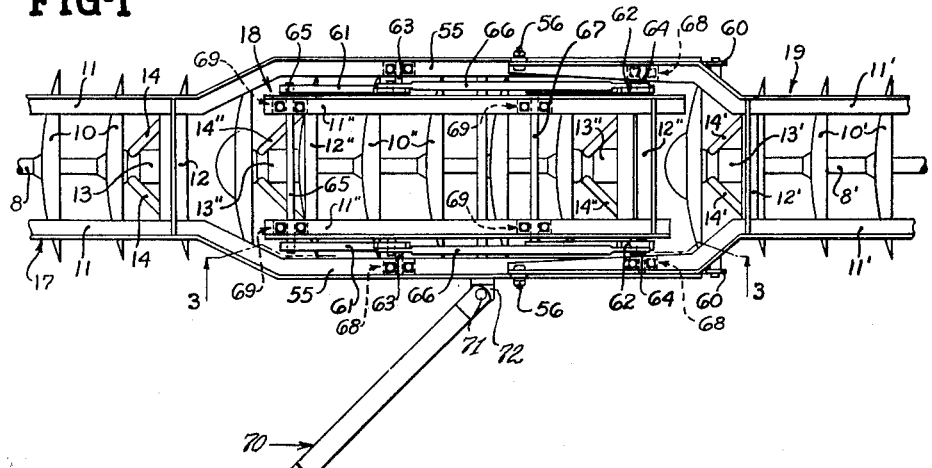

This invention embodies improvements over the type of harrow disclosed in Patent No. 1,941,504 granted to me on January 2, 1934, and reference may be had to said patent for certain typical details of construction, although the principles of this invention can be applied to other types of harrows, as well.

As suggests in said patent, the disk harrow of the present invention comprises a pair of right and left hand gangs disposed substantially abreast of each other and pivotally connected together at their inner ends. The two gangs are substantially duplicates, with the exception that the disks thereof face in opposite directions, and hence a description of one gang, in which the principles of the present invention have been incorporated, will be sufficient.

Referring now to the drawing, the harrow gang comprises a main or inner section 17, a center section 18, and an outer section 19. Each main section 17 comprises a frame built up of two generally parallel angle bars 11, cross connected by transverse frame bars 12. Disks 10 are mounted on shafts 8 journaled in bearings 13 that are connected with and supported under said frame on standards 14.

The parallel frame members 11 of the inner or main section 17 diverge outwardly beyond the disk assembly of the section and then continue parallel, as at 55, being widened sufficiently to receive between them the frame of the center section 18.

The outer section 19 is similar in construction to the inner section 17, having a frame made up of parallel angle iron members 11' cross connected by transverse frame bars 12', and a disk section composed of disks 10' supported on a gang shaft 8' which is journaled in bearings 13' carried under the frame on standards 14'. The inner ends of the frame members 11' are spread apart to coincide with the extensions 55, and are extended inwardly beyond the disk section parallel to and in overlapping relation with the extensions 55. At a point substantially midway between the ends of the disk sections of the inner gang section 17 and the outer gang section 19, the frame members 11' are pivotally connected by bolts 56 to lugs 57 fixed to and extending upwardly from the inner frame extensions 55. The outer section is thus adapted to swing upwardly relative to the inner section 17 about the longitudinal axis of the pivot bolts 56, 56, but is limited in its downward swinging by the extensions 55 upon which the frame members 11' rest when the outer section is in its lowered position substantially parallel to and in line with the inner section. Hooks 60 are pivoted on each of the frame members 11' adjacent the ends of the extensions 55 and are adapted to engage the under sides of the extensions to hold the outer sections against upward swinging about the pivots 56, 56 when it is desired to lock the inner and outer sections rigidly together. Thus, when the hooks 60 are latched under the extensions 55, the outer section 19 is, in effect, a rigid continuation of the inner section 17, with an open space between the ends of the disk sections in which the center section 18 is disposed.

The center section 18 comprises a frame made up of parallel angle irons 11'' cross connected by transverse bars 12'', and having a disk section made up of disks 10'' supported on a gang shaft 8'' which is journaled in bearings 13'' connected with and supported under the frame by standards 14''. The center section 18 is connected to the main or inner section 17 for relative vertical movement by means of two pairs of bell cranks 61 and 62 disposed between the frame extensions 55 and pivotally connected thereto by transverse pivots 63, 64, respectively. The pivots 63, 64 are preferably stub shafts or pins fixed to their respective bell cranks and journaled in bearing brackets 68 secured to the under sides of the frame members 55. The horizontally extending arms of the bell cranks 61, 62 are rigidly cross connected by rods 65, 67 which are journaled in bearing brackets 69 fixed to the frame members 11'' near opposite ends thereof, and the upwardly extending arms of the bell cranks 61 are connected with the upwardly extending arms of their corresponding bell cranks 62 by links 66. Since the bell cranks 61, 62 are identical in size and shape and are arranged in pairs on transversely aligned pivots, it will be seen that the bell cranks and links form, in effect, a system of parallel linkage that acts to hold the gang shaft 8'' parallel with the gang shafts 8 and 8' regardless of the vertical position of the center section 18 relative to the end sections 17 and 19.

Figure 2:
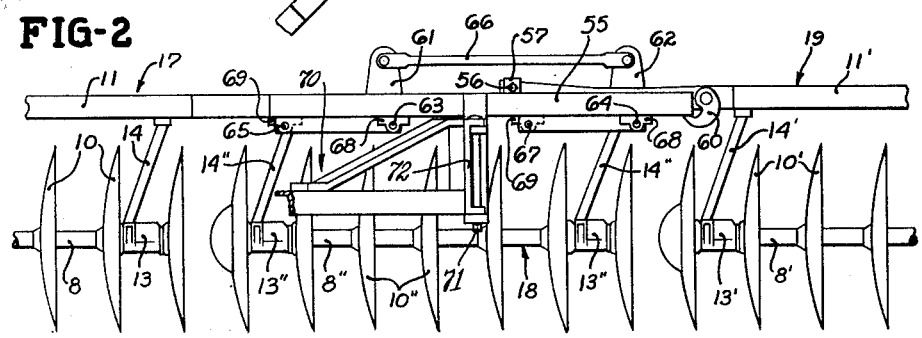
Figure 2 is a front elevation thereof.

Draft is applied to the disk harrow by means that includes two outwardly extending lateral draft members, one of which is shown at 70 in Figures 1 and 2. The member 70 is pivotally connected, as at 71, to a draft bracket 72 which is fixed to the forward angle bar 11 at a point at or closely adjacent to the pivot 56 by which the outer section 19 is pivotally connected with the inner section 17. From Figures 1 and 2 it will also be noted that the point where the draft member 70 is connected is approximately midway the pivots 63 and 64 which connect the center disk section 18 with the other sections.

By virtue of this construction, the draft transmitted by the one member 70 is applied to the three pivotally inter-connected sections in the most nearly direct manner possible, namely, closely adjacent the points of pivotal connection.

Figure 3:
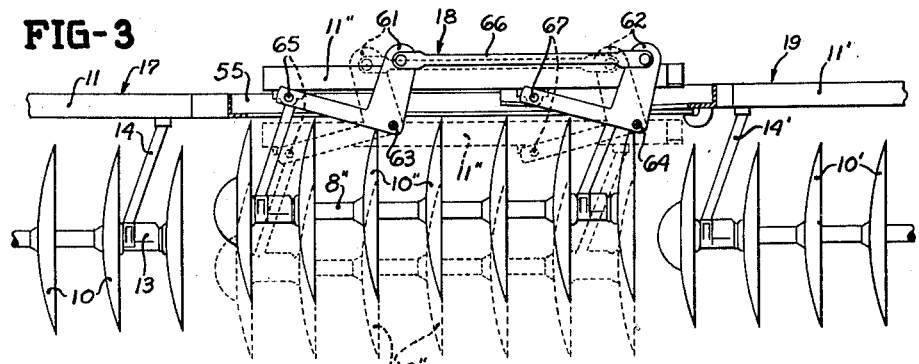
Figure 3 is a sectional view taken substantially along the line 3—3 in Figure 1, showing in solid lines the positions of the various parts when the center section is raised above the level of the outer sections, and in dotted lines, the positions of the parts when the center section is below the outer sections.

Referring now to Figure 3, it will be noticed that the points 65 and 67 of the bell cranks follow arcuate paths about the pivots 63, 64 when the center section rises or falls relative to the end section. When the center section 18 is in the normal level position shown in Figure 2, the laterally extending arms of the bell cranks 61, 62 are exactly horizontal, and in consequence thereof, all points on arcs drawn about the pivots 63, 64 must lie to the right of the normal level positions of the points 65, 67. That is to say, when the center section 18 rises to the position shown in solid lines in Figure 3, the points 65 and 67 swing upwardly and to the right, following their respective arcuate paths, and the section frame and disks are accordingly moved to the right the same distance. The thrust of the disks 10'' is to the left, however, and since the center section 18 can now be moved to the left the distance it was displaced, such thrust acts to swing the points 65, 67 down to their normal level positions. In like manner, when the section falls to the position shown in dotted lines in Figure 3, it is displaced to the right relative to its normal level position, and the thrust of the disk acts to return the section to its normal aligned position.

In normal operation the outer section 19 is rigidly secured to the main or inner section 17, and the center section 18 is allowed to move bodily up or down relative to sections 17 and 19. From the foregoing, it will be seen that the inner and outer sections 17 and 19 may be operating on level ground, with the center section 18 operating on either higher or lower ground; or if the main gang is tilted from the horizontal, the three sections may operate on ground at three different levels.

When it is desired to decrease the over-all width of the harrow or to concentrate the weight of the implement on fewer disks for maximum penetration, or when disking hard, dry ground, the outer section 19 may be swung upwardly about the pivots 56 after disengaging the hooks 60 from the ends of the extensions 55, and folded back over the inner and center sections.

What I claim as my invention is:

1. A harrow gang comprising, in combination, a main disk section, a second disk section, and means connecting said sections together providing for vertical movement of said second section relative to said main section, but maintaining the two sections substantially parallel in all positions.

2. A harrow gang comprising, in combination, a main disk section, a second disk section, and parallel link means connecting said second section to said main section for vertical movement relative thereto, said parallel link means being operative to hold said second section parallel to said main section irrespective of their relative vertical positions.

3. A harrow gang comprising, in combination, a pair of disk sections, means for supporting said sections substantially in alignment with one another and with their adjacent ends spaced apart, a third disk section disposed between said first mentioned sections, and means supporting said third section providing for vertical movement of the latter relative to said first mentioned sections.

4. A harrow gang comprising, in combination, a pair of disk sections, means for supporting said sections substantially in alignment with one another and with their adjacent ends spaced apart, a third disk section disposed between said first mentioned sections, and means connecting said third section to said supporting means providing for vertical movement relative to said first mentioned sections.

5. A harrow gang comprising, in combination, a main disk section and an outer disk section disposed substantially in alignment with one another and spaced apart, means pivotally connecting said sections together for vertical swinging movement whereby said outer section can be swung out of operative position upwardly and folded over upon said main section, means for locking said outer section rigidly to said main section, a third disk section disposed between said main and outer sections, and means connecting said third section to said main section providing for vertical movement relative thereto.

6. A harrow gang comprising, in combination, a frame, a main section and an outer section supported on said frame substantially in alignment with one another and with their adjacent ends spaced apart, a third disk section disposed between said main and outer sections, a pair of bell cranks disposed at one end of said third section on opposite sides thereof and a second pair of bell cranks disposed at the other end of the section on opposite sides thereof, said bell cranks being pivoted on said frame and connected with said third section, and link means connecting each of the bell cranks at one end of the section with the corresponding bell crank at the other end of the section whereby said third section can be moved vertically with respect to said main and outer sections in parallel relation therewith.

7. A harrow gang comprising, in combination, a supporting frame, a pair of outer disk sections, means connecting said sections to said supporting frame substantially in alignment with one another and with their adjacent ends spaced apart, a third disk section disposed between said outer sections and substantially in alignment therewith, and means connecting said third section to said supporting frame whereby said third section is movable bodily up or down relative to the outer sections, said connecting means being responsive to the thrust of the disks for resisting vertical displacement of the third section relative to the outer sections.

8. A harrow gang comprising, in combination, a main disk section, a middle disk section, and an outer disk section, said outer section having a normal operating position substantially in alignment with said main section and spaced apart therefrom, and said middle section being disposed between said main and outer sections, means pivotally connecting said main and outer sections together whereby the outer section can be swung into and out of said normal operating position, means for locking the outer section rigidly to the main section, and means connecting said middle section to said main section providing for vertical movement relative thereto.

9. A harrow gang comprising, in combination, a main disk section, a second disk section, and means connecting said second section to said main section for vertical movement relative thereto, said connecting means comprising at least two bell cranks disposed at opposite ends of said second section, in parallel relation with each other and pivotally connected with said main section for rocking about parallel axes, one arm of each bell crank being pivotally connected with said second section and a common link connected to the other arm of each of said bell cranks, whereby said second section is movable vertically with respect to said main section and is maintained parallel therewith in all positions.

10. A harrow gang comprising, in combination, a main disk section, a second disk section, and means connecting said second section to said main section for vertical movement relative thereto, said connecting means comprising a pair of bell cranks disposed at one end of said second section on opposite sides thereof, respectively, and a second pair of bell cranks disposed at the other end of the section on opposite sides thereof, said bell cranks being pivoted on said main disk section and having corresponding arms pivotally connected with said second section, and link means connecting each of said bell cranks at one end of said second section with the corresponding bell crank at the other end of the section whereby said second section can be moved vertically with respect to said main section in parallel relation therewith.

11. A harrow gang comprising, in combination, a supporting frame, a disk gang, and means connecting said disk gang to said frame for vertical movement relative thereto, said connecting means being responsive to the thrust of the disks for resisting vertical displacement of the disk gang relative to the supporting frame.

12. A harrow gang comprising, in combination, a supporting frame, a disk gang, and means connecting said disk gang to said frame for vertical movement relative thereto, said connecting means comprising a pair of bell cranks disposed near opposite ends of said disk gang and journaled on said supporting frame, each of said bell cranks having a laterally extending arm pivotally connected with the disk gang and a vertically extending arm, said laterally extending arms being horizontal when the gang is in normal operating position relative to the supporting frame, and link means connecting the vertical arms of the bell cranks together.

13. A harrow gang comprising, in combination, a supporting frame, a pair of outer disk sections, means connecting said sections to said supporting frame substantially in alignment with one another and with their adjacent ends spaced apart, a third disk section disposed between said outer sections and substantially in alignment therewith, and means connecting said third section to said supporting frame whereby said third section is movable bodily up or down relative to the outer sections.

14. A harrow gang comprising, in combination, a main disk section and an outer disk section disposed substantially in alignment with one another and spaced apart, means pivotally connecting said sections together for vertical swinging movement, a third disk section disposed between said main and outer sections, and means connecting said third section to said main section providing for vertical movement relative thereto.

15. A harrow gang comprising three frames each supporting a disk section, two of said frames being pivotally connected for relative vertical swinging movement, and means connecting the third frame to one of the other two for relative bodily movement.

16. A harrow gang comprising three frames each supporting a disk section, two of said frames being pivotally connected for relative vertical swinging movement, and means connecting both ends of the third frame to one of the other frames for relative vertical movement.

17. A harrow gang comprising two frames, each supporting a disk section, and means connecting both ends of one frame to the other frame for relative vertical movement.

18. A harrow gang comprising two frames, each supporting a disk section, means connecting the inner end of one frame to the other frame for vertical movement, and other means connecting the outer end of said one frame to said other frame for vertical movement.

19. A harrow gang comprising two frames, each supporting a disk section, means connecting the inner end of one frame to the other frame for vertical movement, other means connecting the outer end of said one frame to said other frame for vertical movement, and means connecting both said connecting means for causing both ends of said one frame to move together.

20. A disk harrow gang comprising three gang sections, and means movably connecting two of the sections to each other, and means movably connecting the third section with one of said two gang sections against the movable connection between said two sections so as to provide for relative movement between the three gang sections.

21. A harrow gang comprising three gang sections, and means movably connecting two of said gang sections with the same end of the third gang section so as to provide for relative movement between the three gang sections.

22. A harrow gang comprising three gang sections, means pivotally connecting the outermost gang section to the innermost gang section, and means movably connecting the third gang section with one of the inner and outer gangs for movement relative thereto in a position therebetween.

23. A harrow gang comprising three gang sections, means pivotally connecting one gang section to one of the other two gang sections, and means connecting the other of said two gang sections with said first gang section for generally vertical floating movement relative thereto in relative close proximity to the adjacent ends of said pivotally connected gang sections.

24. A harrow gang comprising, in combination, a pair of disk sections, means for pivotally connecting said sections together substantially in alignment with one another and with their adjacent ends spaced apart, a third disk section disposed between said first mentioned sections, and means movably connecting said third disk section with at least one of said pair of disk sections for movement into and out of substantial alignment therewith.

25. A disk harrow gang comprising a pair of disk gang sections, and means connecting one of said disk gang sections with the other for movement relative thereto, said means including parts so angularly related that the thrust of the soil pressure against one gang section tends to hold it in position relative to the other gang section.

26. A harrow comprising a frame, a disk gang movable relative thereto, and means swingable about a horizontal axis for connecting said gang with said frame for generally vertical movement relative to the latter.

27. A harrow as defined in claim 26, further characterized by said means comprising generally vertically swingable crank means pivoted to said frame and connected at their free ends with the disk gang.

28. A disk harrow gang comprising a pair of disk gang sections, and parallel link means connecting one of said disk gang sections with the other for generally vertical swinging movement, said link means being substantially horizontal when said gangs are in alignment.

29. A harrow gang comprising a pair of disk sections disposed substantially in alignment with one another and spaced apart, means pivotally connecting said sections together for vertical swinging movement, a third disk section disposed between said main and outer sections and movably connected therewith, and draft means operatively connected with said pair of sections adjacent the means pivotally connecting them together.

30. A harrow gang comprising, in combination, a main disk section and an outer disk section disposed substantially in alignment with one another and spaced apart, means pivotally connecting said sections together for vertical swinging movement about a generally longitudinal axis, whereby said outer section can be swung out of operative position upwardly and folded over upon said main section, a third disk section disposed between said main and outer sections, means connecting said third section to said main section for movement relative thereto about a pair of spaced axes, thereby providing for vertical movement relative thereto, and draft means pivotally connected with said main section adjacent said longitudinal axis and between said spaced axes.

31. A harrow comprising three sections, means movably connecting a first section to one of the other two sections for movement about a horizontal axis, means movably connecting the third section to said one section adjacent said axis, and draft means also connected to said one section adjacent said axis for applying draft to said first section and said one section and also to said third section through the means connecting said third section to said one section.

32. A harrow comprising three gang sections, means movably connecting a first section to one of the other two sections for movement about a horizontal axis, means movably connecting the third section to said one section at points on opposite sides of said axis, and draft means connected to said one section at a point adjacent said axis and between the two points at which the third section is connected to said one section, whereby said draft means applies draft to said first section and said one section and also to said third section through said two points of connection.

33. A harrow as defined in claim 26, further characterized by said means comprising arms rigidly interconnected by means pivoting the arms to said frame for relative vertical swinging movement about a horizontal axis.

34. A disk harrow comprising three sets of disks normally disposed in generally axial alignment, frame bars associated with the sets of disks, means pivotally connecting the frame bars of two of said sets of disks so that said two sets are hinged together for generally vertical swinging movement, one relative to the other, in spaced apart relation with the third set of disks disposed therebetween and means pivotally connecting the frame bars of the third set of disks with the frame bars of said other sets, whereby all of the sets of disks have independent vertical movement and said one set of disks may be swung upwardly relative to the other set of disks to reduce the width of the harrow.

35. A disk harrow comprising an inner set of disks, an intermediate set of disks, and an outer set of disks normally in end to end relation, frame bars for each set of disks, means hingedly connecting the frame bars of the outer set to the frame bars of the inner set to provide for folding up the outer set of disks relative to the inner set of disks, and means connecting the intermediate set of disks and its frame bars with the frame bars of the inner set of disks whereby the sets of disks are free to move generally vertically independently of each other.

36. A disk harrow comprising an inner disk gang section, an outer disk gang section, and an intermediate disk gang section normally disposed between said inner and outer disk gang sections, means serving as a frame for each of said disk gang sections, means pivotally connecting the frame means of the outer disk gang section to the frame means of the inner disk gang section with said last-named sections in spaced apart relation to accommodate the position of the intermediate disk gang section therebetween and to provide for upward folding movement of the outer disk gang section relative to the inner disk gang section, and means connecting the intermediate disk gang section with the frame means of the inner disk gang section whereby the intermediate disk gang section is capable of independent vertical movement relative to the other disk gang sections.

37. An agricultural machine comprising frame means, a disk section, and generally vertically swingable means connecting each end portion of said disk section with said frame means.

38. An agricultural machine comprising frame means, a disk section, and a pair of generally parallel members connected with said frame means and with the end portions, respectively, of said disk section so that each end of the latter has the substantially same movement relative to said frame means as the other end.

39. An agricultural machine comprising a pair of disk sections, frame means therefor, and means connecting each disk section with said frame means, the connecting means for one disk section including parts swingably connecting the one disk section for generally vertical movement but holding the axis thereof in line with or generally parallel to the axis of the other disk section.

CHARLES H. WHITE.

CERTIFICATE OF CORRECTION.

Patent No. 2,245,374. June 10, 1941.

CHARLES H. WHITE.

It is hereby certified that error appears in the printed specification of the above numbered patent requiring correction as follows: Page 4, first column. line 12, claim 20, for the word "against" read --adjacent--; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.